United States Patent
Liu et al.

(10) Patent No.: US 10,255,873 B2
(45) Date of Patent: Apr. 9, 2019

(54) TOUCH MODULE AND MANUFACTURING METHOD THEREOF

(71) Applicant: TPK Touch Solutions Inc., Taipei (TW)

(72) Inventors: Chen-Yu Liu, Taoyuan (TW); Lu-Hsing Lee, Taoyuan (TW); Cheng-Chieh Chang, Taoyuan (TW); Huai-San Ku, Taipei (TW)

(73) Assignee: TPK Touch Solutions Inc., Taipei (TW)

( * ) Notice: Subject to any disclaimer, the term of this patent is extended or adjusted under 35 U.S.C. 154(b) by 186 days.

(21) Appl. No.: 14/720,954

(22) Filed: May 25, 2015

(65) Prior Publication Data

US 2015/0346878 A1 Dec. 3, 2015

(30) Foreign Application Priority Data

May 30, 2014 (CN) .......................... 2014 1 0240260

(51) Int. Cl.
*G06F 3/047* (2006.01)
*G09G 5/00* (2006.01)
*G06F 3/044* (2006.01)

(52) U.S. Cl.
CPC ............. *G09G 5/003* (2013.01); *G06F 3/044* (2013.01); *G06F 2203/04103* (2013.01); *G06F 2203/04111* (2013.01)

(58) Field of Classification Search
CPC ....................... G09G 5/003; G09G 2300/0426; G06F 3/044; G06F 2203/04111; G06F 2203/04103
USPC ........................... 345/173; 178/18.01; 427/79
See application file for complete search history.

(56) References Cited

U.S. PATENT DOCUMENTS

| | | | | |
|---|---|---|---|---|
| 8,325,146 B2* | 12/2012 | Jiang | ....................... | G06F 3/045 345/173 |
| 2005/0156906 A1* | 7/2005 | Chiu | ....................... | G06F 3/044 345/173 |
| 2014/0308435 A1* | 10/2014 | Burberry | ................. | G06F 3/044 427/79 |
| 2014/0333578 A1* | 11/2014 | Wu | ......................... | G06F 3/041 345/174 |
| 2015/0177867 A1* | 6/2015 | Chung | ..................... | G06F 3/044 345/174 |
| 2015/0277623 A1* | 10/2015 | Nakamura | .............. | G06F 3/044 345/174 |
| 2016/0117005 A1* | 4/2016 | Osawa | ............... | H03K 17/9622 345/173 |

* cited by examiner

*Primary Examiner* — Vinh T Lam
(74) *Attorney, Agent, or Firm* — Cooper Legal Group, LLC

(57) ABSTRACT

A touch module and a manufacturing method thereof are disclosed. The touch module includes a substrate, at least one bridge, an active layer, at least two first touch electrodes, at least two second touch electrodes, and at least one electrode channel. The bridge is disposed on the substrate. The active layer overlays the bridge and the substrate. The first touch electrodes are embedded in the active layer and electrically touch the bridge, so that the first touch electrodes are electrically connected to each other via the bridge. The electrode channel is embedded in the active layer, and is configured to allow the second touch electrodes to be electrically connected to each other. The first touch electrodes are electrically isolated from the second touch electrodes.

23 Claims, 10 Drawing Sheets

TOUCH MODULE AND MANUFACTURING METHOD THEREOF

BACKGROUND OF THE INVENTION

This application claims priority to China Application Serial Number 201410240260.6, filed May 30, 2014, which is herein incorporated by reference.

FIELD OF INVENTION

The present disclosure relates to electronic devices and manufacturing methods. More particularly, the present disclosure relates to touch modules and manufacturing methods thereof.

DESCRIPTION OF RELATED ART

With advances in electronic technology, touch modules are widely used in various kinds of electronic devices, such as mobile phones and tablet computers.

A typical touch module can be, for example, disposed on a display screen, and include a plurality of touch electrodes. When an object (e.g., a finger or a stylus pen) approaches or touches the display screen, a corresponding touch electrode generates an electronic signal and transmits the electronic signal to a control circuit, such that touch sensing can be realized.

In a manufacturing process of the touch module, conductive material disposed between the touch electrodes is typically removed by an etching process, so as to pattern the touch electrodes and isolate the touch electrodes from each other. However, removing the conductive material disposed between the touch electrodes causes uneven refractive indexes of the touch module, resulting in adversely affecting the optical consistency in the appearance of the touch module.

SUMMARY OF THE INVENTION

Thus, in order to avoid uneven refractive indexes of a touch module, one aspect of the present disclosure is related to a touch module. In accordance with various embodiments of the present disclosure, the touch module includes a substrate, at least one bridge disposed on the substrate, an active layer, at least two first touch electrodes, at least two second touch electrodes, and at least one electrode channel. The bridge is disposed on the substrate. The active layer overlays the bridge and the substrate. The first touch electrodes are embedded in the active layer and electrically contacted to the bridge, such that the first touch electrodes are electrically connected to each other via the bridge. The second touch electrodes are embedded in the active layer. The electrode channel is embedded in the active layer, and configured to electrically connect the second touch electrodes to each other. The first touch electrodes are electrically isolated from the second touch electrodes.

In accordance with various embodiments of the present disclosure, heights of the first touch electrodes relative to the substrate are different from heights of the second touch electrodes relative to the substrate.

In accordance with various embodiments of the present disclosure, a difference between the heights of the first touch electrodes relative to the substrate and the heights of the second touch electrodes relative to the substrate is greater than substantially 50 nanometers.

In accordance with various embodiments of the present disclosure, heights of the first touch electrodes relative to the substrate are the same as heights of the second touch electrodes relative to the substrate.

In accordance with various embodiments of the present disclosure, an isolating layer is disposed on the bridge, and configured to isolate the bridge from the electrode channel.

In accordance with various embodiments of the present disclosure, a conductive residual material is formed on a surface of the active layer. An orthogonal projection of the conductive residual material onto the substrate is located among orthogonal projections of the first touch electrodes, the second touch electrodes, and the electrode channel onto the substrate.

In accordance with various embodiments of the present disclosure, the orthogonal projections of the conductive residual material, the first touch electrodes, the second touch electrodes, and the electrode channel onto the substrate are substantially not overlapped with each other.

In accordance with various embodiments of the present disclosure, a height of the conductive residual material relative to the substrate is different from heights of the first touch electrodes, the second touch electrodes, and the electrode channel relative to the substrate to cause the conductive residual material to be isolated from the first touch electrodes, the second touch electrodes, and the electrode channel.

In accordance with various embodiments of the present disclosure, a difference between the height of the conductive residual material relative to the substrate and the heights of the first touch electrodes relative to the substrate is greater than substantially 50 nanometers, and a difference between the height of the conductive residual material relative to the substrate and the heights of the second touch electrodes relative to the substrate is greater than substantially 50 nanometers.

In accordance with various embodiments of the present disclosure, embedding depths of the first touch electrodes or the second touch electrodes relative to the surface of the active layer on which the conductive residual material is disposed are substantially 10 to 500 nanometers.

In accordance with various embodiments of the present disclosure, a height of the electrode channel relative to the substrate is the same as heights of the second touch electrodes relative to the substrate.

In accordance with various embodiments of the present disclosure, the first touch electrodes are disposed along a first direction, the second touch electrodes are disposed along a second direction, and the first direction is different from the second direction.

In accordance with various embodiments of the present disclosure, each of the first touch electrodes and the second touch electrodes has a diamond shape.

Another aspect of the present disclosure is related to a manufacturing method of the touch module. In accordance with various embodiments of the present disclosure, the manufacturing method includes forming at least one bridge on the substrate; forming an active layer overlaying the bridge and the substrate; and embedding at least two first touch electrodes, at least two second touch electrodes, and at least one electrode channel into the active layer, such that the first touch electrodes are electrically contacted to the bridge and electrically connected to each other via the bridge. The electrode channel is configured to allow the second touch electrodes to be electrically connected to each other.

In accordance with various embodiments of the present disclosure, the manufacturing method further includes providing at least one isolating layer on the bridge before forming the active layer. The active layer overlays the bridge, the isolating layer, and the substrate.

In accordance with various embodiments of the present disclosure, the step of embedding the first touch electrodes, the second touch electrodes, and the electrode channel into the active layer includes providing a first conductive material layer on the active layer; and embedding a first embedding portion of the first conductive material layer into the active layer to separately form the first touch electrodes, the second touch electrodes, and the electrode channel, and make the first touch electrodes electrically contact the bridge, and retaining a first retention portion of the first conductive material layer on the active layer. The electrode channel is electrically isolated from the bridge by the isolating layer.

In accordance with various embodiments of the present disclosure, the step of embedding the first embedding portion of the first conductive material layer into the active layer includes providing an embedding ink on the first embedding portion of the first conductive material layer, so as to cause the first embedding portion of the first conductive material layer to be embedded into the active layer.

In accordance with various embodiments of the present disclosure, the step of embedding the first embedding portion of the first conductive material layer into the active layer includes embedding the first embedding portion of the first conductive material layer into the active layer until the first touch electrodes and the second touch electrodes in the first embedding portion are contacted to the substrate and the electrode channel in the first embedding portion is contacted to the isolating layer.

In accordance with various embodiments of the present disclosure, the retention portion includes a conductive residual material, and the orthogonal projection of the conductive residual material onto the substrate is located among orthogonal projections of the first touch electrodes, the second touch electrodes, and the electrode channel onto the substrate.

In accordance with various embodiments of the present disclosure, the step of embedding the first touch electrodes, the second touch electrodes, and the electrode channel into the active layer includes providing a first conductive material layer on the active layer; embedding a first embedding portion of the first conductive material layer into the active layer to a height relative to the substrate, so as to form a second conductive material layer, and retaining a first retention portion of the first conductive material layer on the active layer, in which the second conductive material layer is not electrically contacted to the bridge; embedding a second embedding portion of the second conductive material layer into the active layer to form the first touch electrodes and make the first touch electrodes electrically contact the bridge, and retaining the second retention portion of the second conductive material layer in the active layer at the height relative to the substrate. The second retention portion includes the second touch electrodes and the electrode channel.

In accordance with various embodiments of the present disclosure, the step of embedding the second embedding portion of the second conductive material layer into the active layer includes providing an embedding ink on the active layer at a position corresponding to the second embedding portion of the second conductive material layer, so as to cause the second embedding portion of the second conductive material layer to be further embedded into the active layer.

In accordance with various embodiments of the present disclosure, the step of embedding the second embedding portion of the second conductive material layer into the active layer includes embedding the second embedding portion of the second conductive material layer into the active layer until the first touch electrodes of the second embedding portion is contacted to the substrate.

In accordance with various embodiments of the present disclosure, the first retention portion includes a conductive residual material, and an orthogonal projection of the conductive residual material onto the substrate is located among orthogonal projections of the first touch electrodes, the second touch electrodes, and the electrode channel onto the substrate.

In view of the above, through application of various embodiments described above, a touch module can be realized. By embedding touch electrodes into the substrate, the touch electrodes can be patterned and isolated from each other. As a result, patterning the touch electrodes by an etching process can be avoided, such that the problem of adversely affecting the optical consistency in the appearance of the touch module caused by uneven refractive indexes of the touch module is not encountered.

BRIEF DESCRIPTION OF THE DRAWINGS

FIGS. 1A-5A illustrate a manufacturing method of a touch module according to various embodiments of the present disclosure.

FIG. 1B-5B are sectional views of the touch module along lines A-A in FIGS. 1A-5A according to various embodiments of the present disclosure.

FIGS. 6A-9A illustrate a manufacturing method of a touch module according to various embodiments of the present disclosure.

FIG. 6B-9B are sectional views of the touch module along lines A-A in FIGS. 6A-9A according to various embodiments of the present disclosure.

DETAILED DESCRIPTION OF THE INVENTION

Figure 1A:
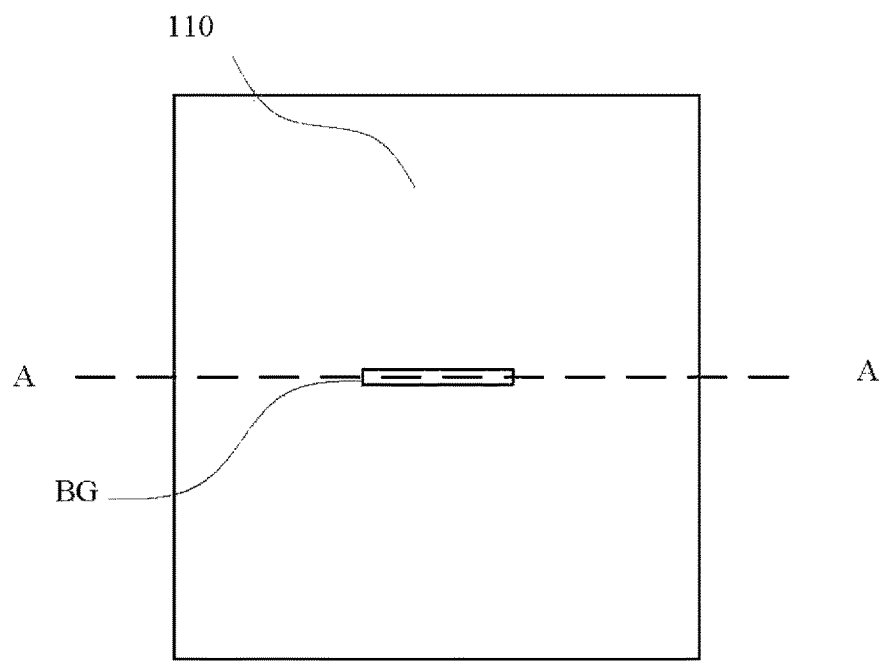

Reference will now be made in detail to embodiments of the present disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a manufacturing method of a touch module. In the following paragraphs, a first method and a second embodiment will be used as examples to describe details of the present disclosure. However, the disclosure is not limited to these embodiments. Other implementations are within the contemplated scope of the present disclosure.

First Method

FIGS. 1A-5A illustrate a manufacturing method of a touch module 100 according to at least one embodiment of the present disclosure. FIGS. 1B-5B are sectional views of the touch module 100 along lines A-A in FIGS. 1A-5A according to at least one embodiment of the present disclosure.

Figure 1B:
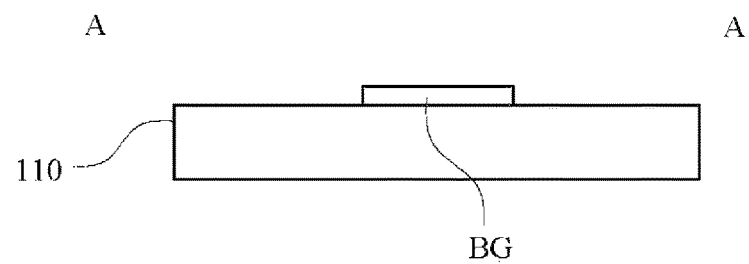

Reference is made to FIG. 1A and FIG. 1B. In the first step, at least one bridge BG is formed on a substrate 110. In some embodiments, the bridge BG is made of metal, metal oxide, conductive polymer, or another suitable conductive material, but is not limited in this regard. In some embodiments, the substrate 110 is made of glass, plastic, or another suitable material, but is not limited in this regard.

Figure 2A:
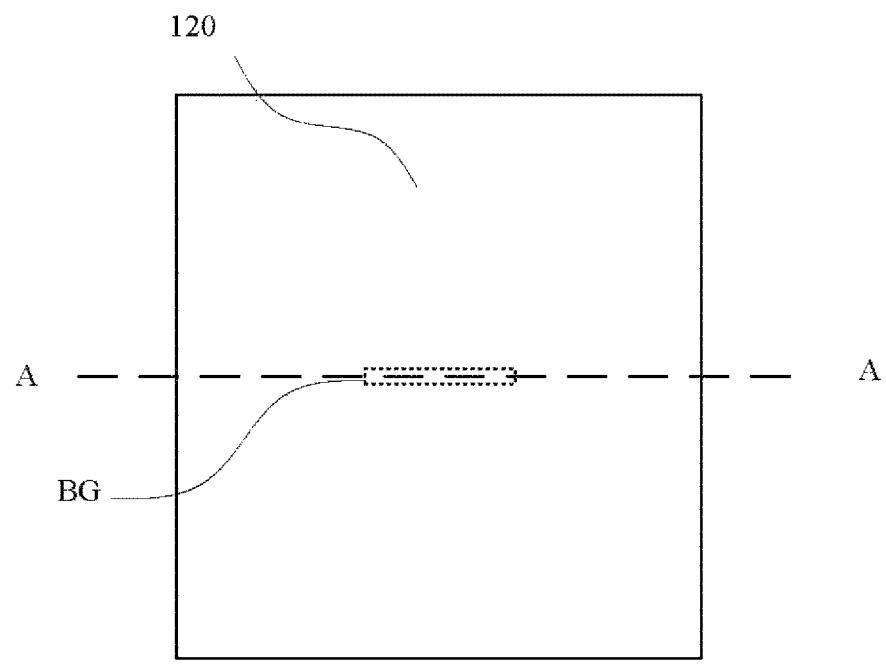
Figure 2B:
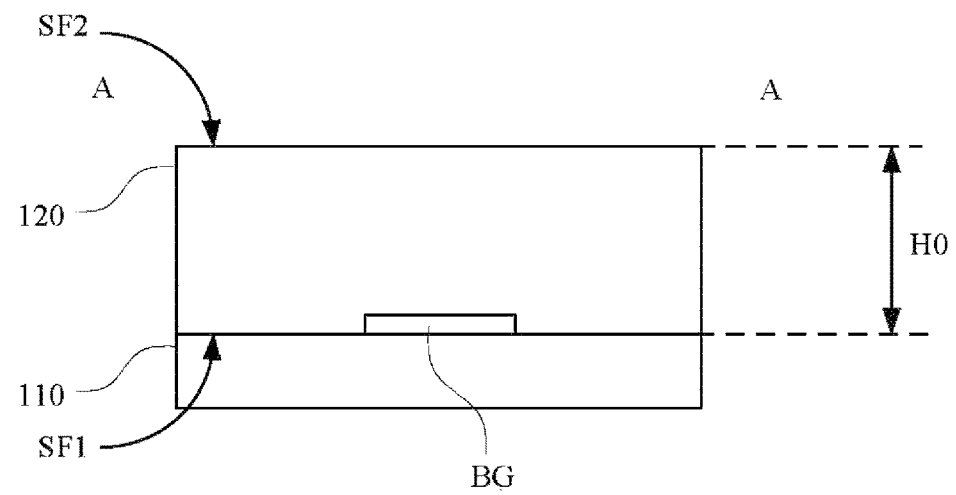

Referring to FIG. 2A and FIG. 2B, in the second step, an active layer 120 is formed, and the active layer 120 overlays the bridge BG and the substrate 110. The active layer 120 has a surface SF1 and a surface SF2. The surface SF1 is in contact with the substrate 110. In some embodiments, the thickness of the active layer 120 (that is, H0) is substantially 50 to 550 nanometers, but is not limited in this regard. In some embodiments, the active layer 120 is made of polymethyl methacrylate (PMMA), polycarbonate (PC), polyethylene terephthalate (PET), cyclo olefin polymer (COP), or another suitable high polymer material, but is not limited in this regard.

Figure 3A:
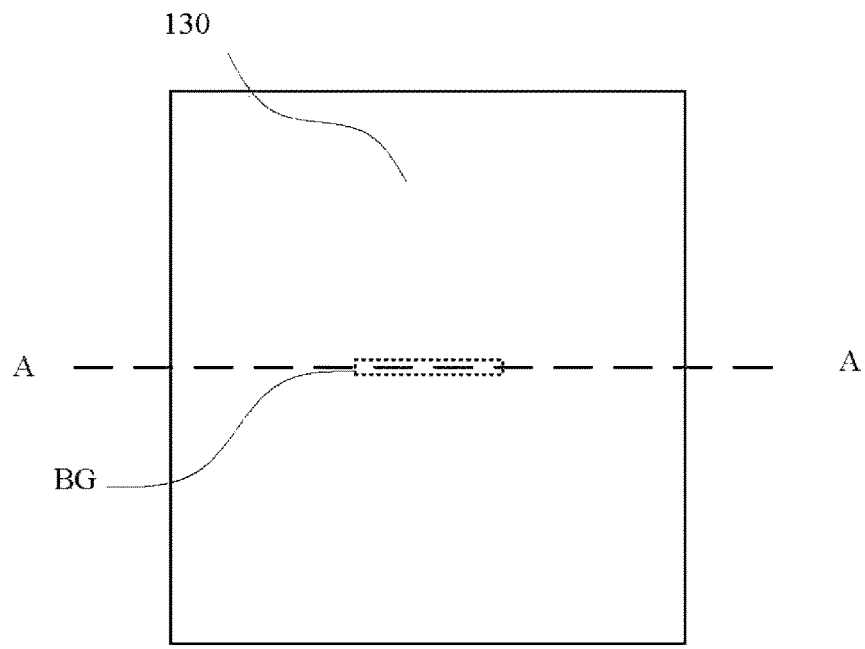
Figure 3B:
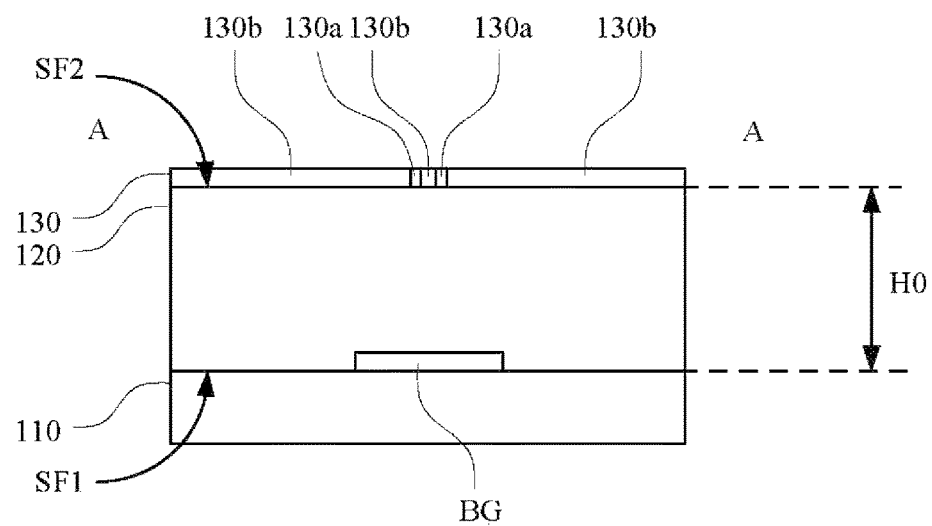

Reference is made next to FIG. 3A and FIG. 3B. In the third step, a first conductive material layer 130 is provided on the surface SF2 of the active layer 120. The first conductive material layer 130 includes a first retention portion 130a and a first embedding portion 130B. In some embodiments, the first conductive material layer 130 is made of carbon nanotubes, nano metal wires, a conductive adhesive, conductive polymer, grapheme, nano metal, or another suitable conductive material, but is not limited in this regard.

Figure 4A:
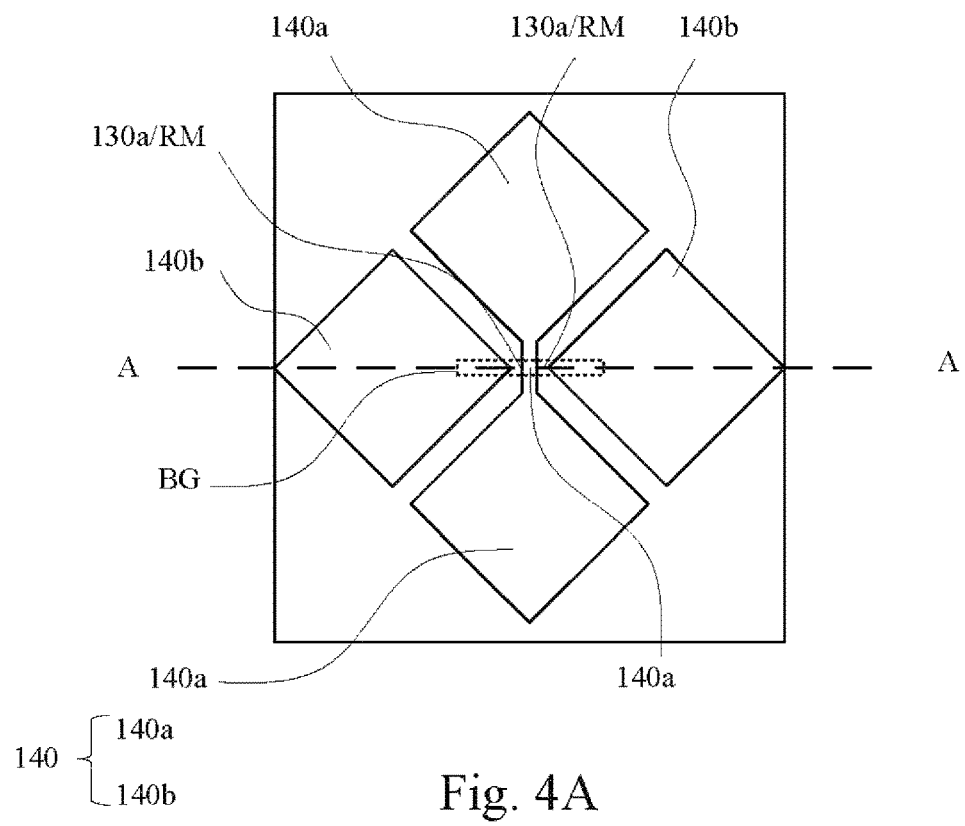
Figure 4B:
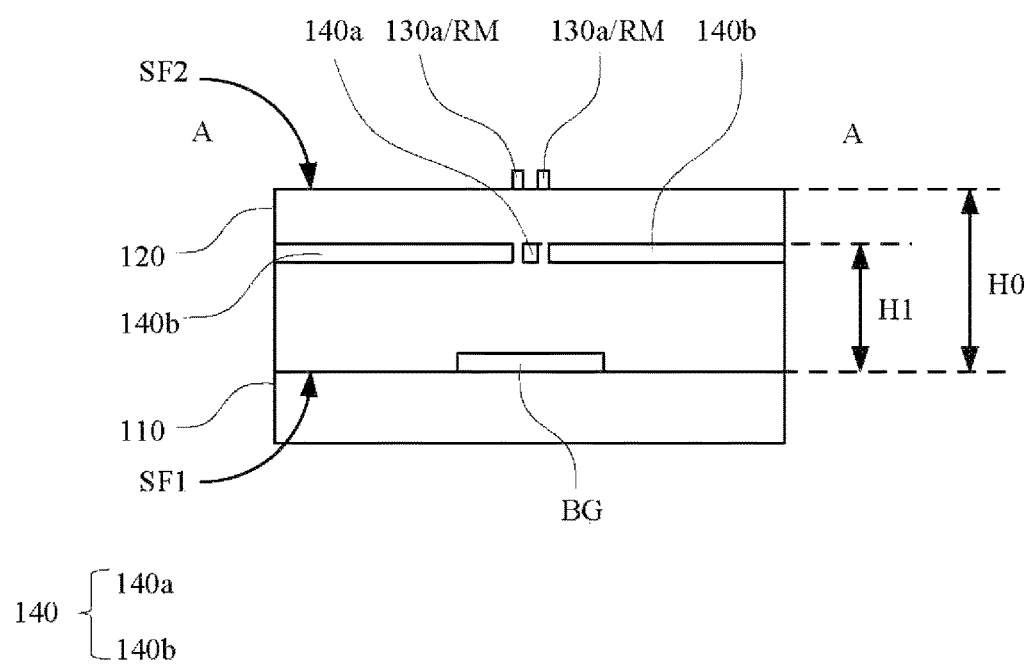

Reference is made now to FIG. 4A and FIG. 4B. In the fourth step, the first embedding portion 130b of the first conductive material layer 130 is embedded into the active layer 120 to a height H1 relative to the substrate 110 to form a second conductive material layer 140, and the first retention portion 130a of the first conductive material layer 130 is retained on the surface SF2 of the active layer 120 to form a conductive residual material RM.

In some embodiments, the conductive residual material RM has a height H0 relative to the substrate 110. The height H0 is sufficiently different from the height H1 to cause the conductive residual material RM to be isolated from the second conductive material layer 140. In some embodiments, a difference between the height H0 of the conductive residual material RM relative to the substrate 110 and the height H1 of the second conductive material layer 140 relative to the substrate 110 is substantially greater than 50 nanometers.

In some embodiments, the second conductive material layer 140 includes a second retention portion 140a and a second embedding portion 140b. The second retention portion 140a is configured to form second touch electrodes E2 and an electrode channel EC in subsequent steps. The second embedding portion 140b is configured to form first touch electrodes E1 in subsequent steps. The second conductive material layer 140 does not electrically contact the bridge BG.

The phrase "conductive residual material RM" used herein refers to a conductive material which is not used to fabricate the first touch electrodes E1, the second touch electrodes E2, and the electrode channel in this manufacturing process. In some embodiments, an orthogonal projection of the conductive residual material RM onto the substrate 110 is located among orthogonal projections of the first touch electrodes E1, the second touch electrodes E2, and the electrode channel EC onto the substrate 110.

In some embodiments, in the fourth step described above, the first embedding portion 130b of the first conductive material layer 130 is embedded into the active layer 120 from the surface SF2 of the active layer 120 by providing a specific liquid (referred to as an embedding ink hereinafter) on the first embedding portion 130b of the first conductive material layer 130. That is, by providing the embedding ink on the first embedding portion 130b of the first conductive material layer 130, the corresponding portion of the active layer 120 swells, such that the conductive material of the first conductive material layer 130 permeates the active layer 120 to allow the first embedding portion 130b to be embedded into the active layer 120. It is noted that the composition of the embedding ink corresponds to the material of the active layer 120, and any liquid that makes the active layer 120 swell to enable the conductive material to permeate into the active layer 120 can be used as the embedding ink. In some embodiments, a solubility parameter of the embedding ink is close to a solubility parameter of the material of the active layer 120.

It is noted that, in some embodiments, the embedding ink can be provided by spraying or printing. However, the present disclosure is not limited in this regard.

Figure 5A:
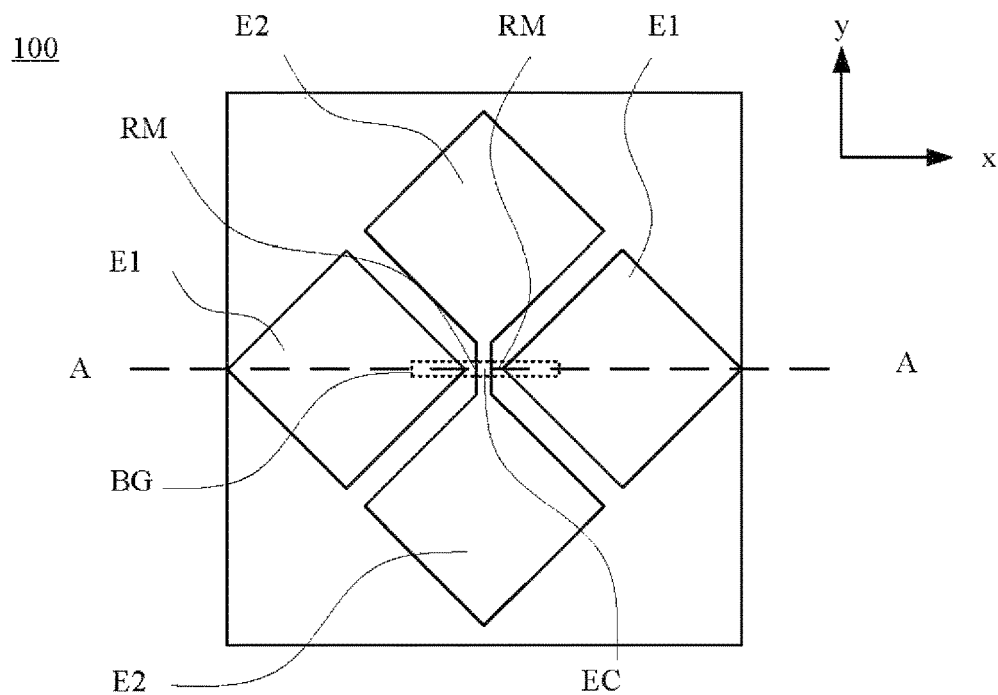
Figure 5B:
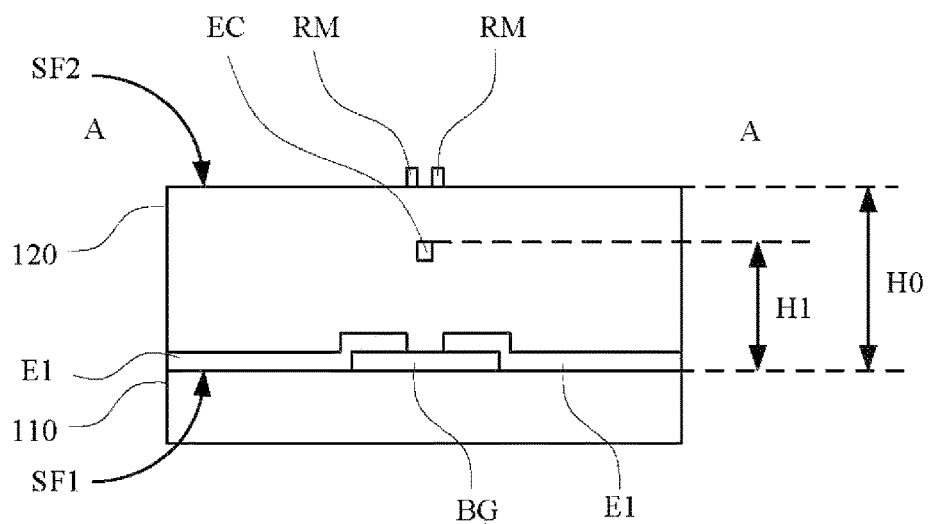

Reference is now made to FIG. 5A and FIG. 5B. In the fifth step, the second embedding portion 140b of the second conductive material layer 140 is embedded into the active layer 120 to form the first touch electrodes E1, and make the first touch electrodes E1 electrically contact the bridge BG, such that the first touch electrodes E1 are electrically connected to each other via the bridge BG. In addition, in this step, the second retention portion 140a of the second conductive material layer 140 is retained in the active layer 120 at the height H1 relative to the substrate 110. The second retention portion 140a includes the second touch electrodes E2 and the electrode channel EC.

In some embodiments, in the fifth step, the second embedding portion 140b of the second conductive material layer 140 is embedded into the active layer 120 until the second embedding portion 140b contacts the substrate 110.

In some embodiments, in the fifth step, the second embedding portion 140b of the second conductive material layer 140 is embedded into the active layer 120 by providing the embedding ink on the surface SF2 of the active layer 120 at a position corresponding to the second embedding portion 140b. That is, by providing the embedding ink on the surface SF2 of the active layer 120 at the position corresponding to the second embedding portion 140b, a corresponding portion of the active layer 120 swells, such that the second embedding portion 140b of the second conductive material layer 140 can be further embedded into the active layer 120. It is noted that details of the embedding ink can be ascertained by referring to the previous paragraphs, and a description in this regard will not be repeated herein.

In some embodiments, heights of the first touch electrodes E1 relative to the substrate 110 are sufficiently different from the heights H1 of the second touch electrodes E2 and the electrode channel EC relative to the substrate 110. In some embodiments, a difference between the heights of the first touch electrodes E1 relative to the substrate 110 and the heights of the second touch electrodes E2 and electrode channel EC relative to the substrate 110 is substantially greater than 50 nanometers to cause the first touch electrodes E1 to be electrically isolated from the second touch electrodes E2 and the electrode channel EC.

Through utilizing the manufacturing method described above, the touch module 100 can be realized. By patterning the first and second touch electrodes E1, E2 and the electrode channel EC with such an embedding process and instead of using an etching process, the problem of adversely affecting the optical consistency in the appearance of the touch module 100 caused by uneven refractive indexes of the touch module 100 can be avoided.

That is, by patterning the first and second touch electrodes E1, E2 and the electrode channel EC with such an embedding process, substantially no gap or overlap is present among the orthogonal projections of the first touch electrodes E1, the second touch electrodes E2, the electrode channel EC, and the conductive residual material RM onto the substrate 110. As a result, the problem of adversely affecting the optical consistency in the appearance of the touch module 100 caused by uneven refractive indexes of the touch module 100 can be avoided.

It should be noted that, in the description herein and throughout the claims that follow, the term "substantially" is used in association with values that may vary slightly and in association with slight deviations that may result from manufacturing processes, in which such minor errors do not change the properties relevant to the values and the characteristics of the elements. For example, manufacturing deviation of the first touch electrodes E1, the second touch electrodes E2, and the electrode channel EC of the touch module 100 may be caused by extrusions in the embedding process, such that there may exist minor gaps or overlaps among the orthogonal projections of the first touch electrodes E1, the second touch electrodes E2, the electrode channel EC, and the conductive residual material RM onto the substrate 110. However, such minor errors (e.g., the gaps and overlaps) caused by manufacturing processes are within the contemplated scope of the present disclosure.

In some embodiments, the second touch electrodes E2 are disposed along, for example, a y-axis in FIG. 5A. Two adjacent second touch electrodes E2 are electrically connected to each other via the electrode channel EC, and the heights of the second touch electrodes E2 relative to the substrate 110 are the same as the height of the electrode channel EC relative to the substrate 110.

In addition, the first touch electrodes E1 are disposed along, for example, an x-axis in FIG. 5A, in which the x-axis is perpendicular to the y-axis. Two adjacent first touch electrodes E1 are electrically connected to each other via the bridge BG.

In some embodiments, the heights of the first touch electrodes E1 and the second touch electrodes E2 relative to the substrate 110 are sufficiently different from the height of the conductive residual material RM relative to the substrate 110 to cause the conductive residual material RM to be electrically isolated from the first touch electrodes E1 and second touch electrodes E2.

Furthermore, in some embodiments, each of the first touch electrodes E1 and the second touch electrodes E2 has a substantially diamond shape.

In addition, in some embodiments, the first touch electrodes E1, the second touch electrodes E2, and the electrode channel EC are completely embedded in the active layer 120. That is, all of the first touch electrodes E1, the second touch electrodes E2, and the electrode channel EC are not exposed on the surface SF2 of the active layer 120. As a result, it is not necessary for the touch module 100 to have an additional passive layer to protect or isolate the first touch electrodes E1, the second touch electrodes E2, and the electrode channel EC, as would be necessary were these elements exposed on the surface SF2 of the active layer 120, such that the time and costs associated with manufacturing the touch module 100 can be decreased. In addition, due to the fact that all of the first touch electrodes E1, the second touch electrodes E2, and the electrode channel EC are completely embedded in the active layer 120, the subsequent manufacturing and assembly processes of the touch module 100 are facilitated.

In some embodiments, in order to avoid exposing any of the first touch electrodes E1, the second touch electrodes E2, or the electrode channel EC on the surface SF2 of the active layer 120, the embedding depth (e.g., H0-H1) of the first touch electrodes E1, the second touch electrodes E2, and the electrode channel EC (e.g., the second touch electrodes E2) which is closest to the surface SF2 of the active layer 120 are substantially 10 to 500 nanometers relative to the surface SF2 of the active layer 120.

Second Method

In the following paragraphs, a second manufacturing method of a touch module 200 is provided in accordance with various embodiments. The manufacturing method of the touch module 200 is substantially the same as the manufacturing method of the touch module 100 described above, with the main differences being that the touch module 200 further includes an isolating layer IN, and the first touch electrodes E1 and the second touch electrodes E2 of the touch module 200 have identical heights relative to the substrate 110. Thus, in the paragraphs below, a description of many aspects that are similar will not be repeated.

Referring back to FIG. 1A and FIG. 2A, in the first step, at least one bridge BG is formed on the substrate 110. It is noted that details of the bridge BG and the substrate 110 can be ascertained by referring to the paragraphs described above, and a description in this regard will not be repeated herein.

Figure 6A:
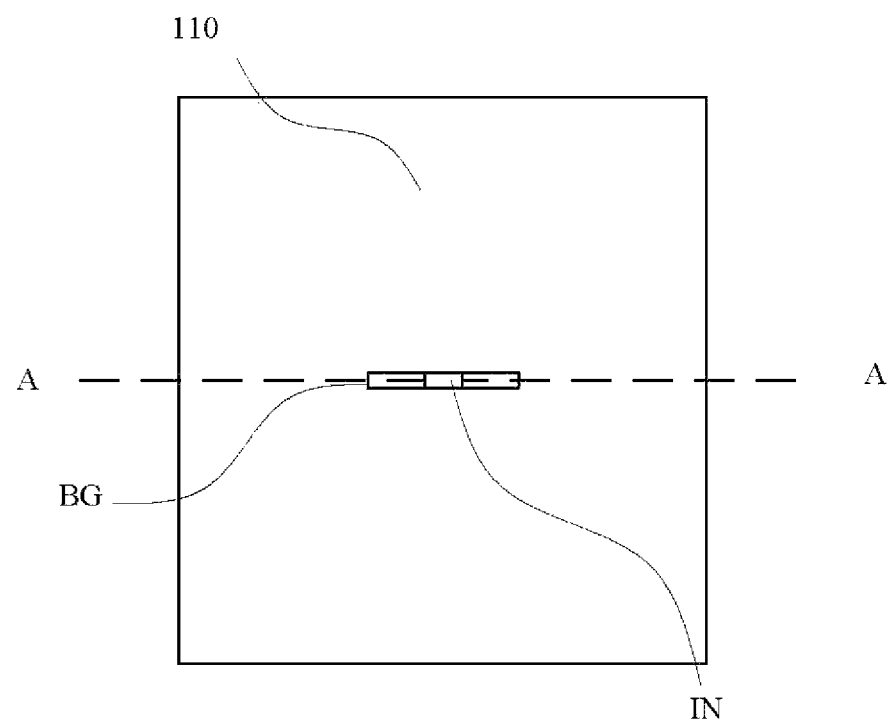
Figure 6B:
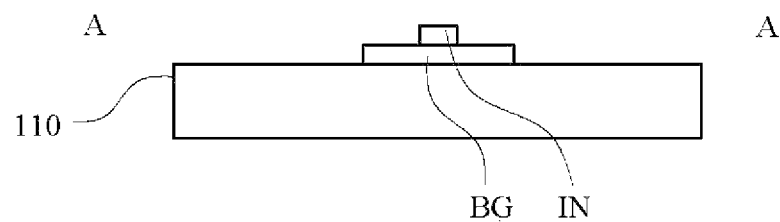

Subsequently, referring to FIG. 6A and FIG. 6B, in the second step, at least one isolating layer IN is provided on the bridge BG. In some embodiments, the isolating layer IN merely overlays a part of the bridge BG.

Figure 7A:
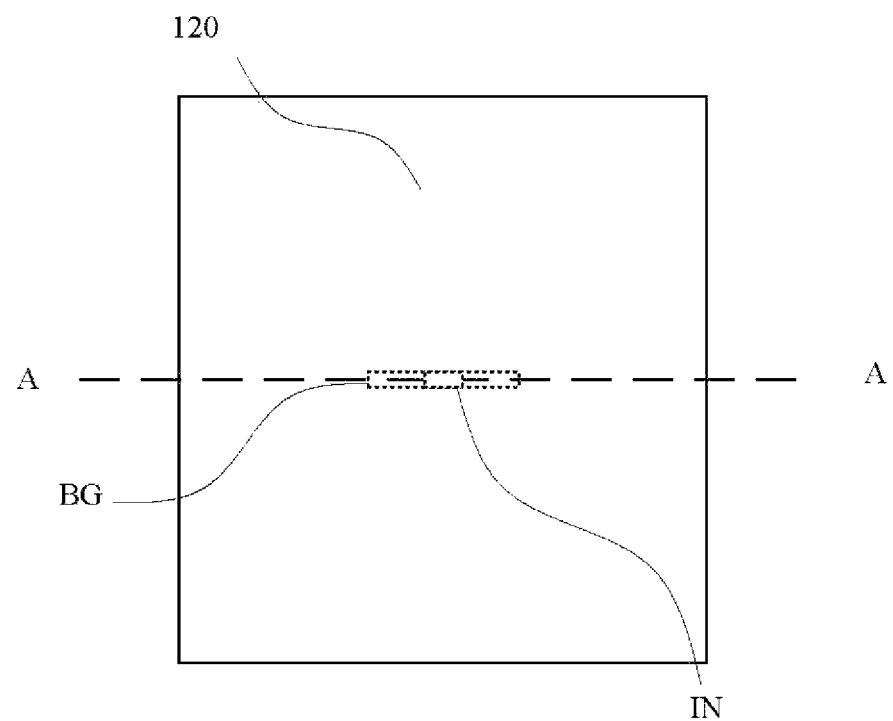
Figure 7B:
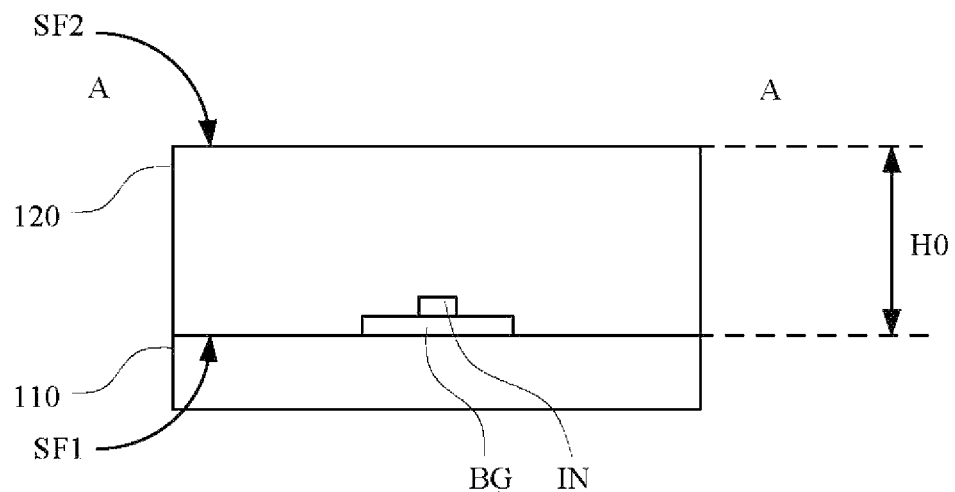

Reference is made next to FIG. 7A and FIG. 7B. In the third step, an active layer 120 is formed. The active layer 120 overlays the bridge BG, the substrate 110, and the isolating layer IN. Details of the active layer 120 can be ascertained by referring to the paragraphs described above, and a description in this regard will not be repeated herein.

Figure 8A:
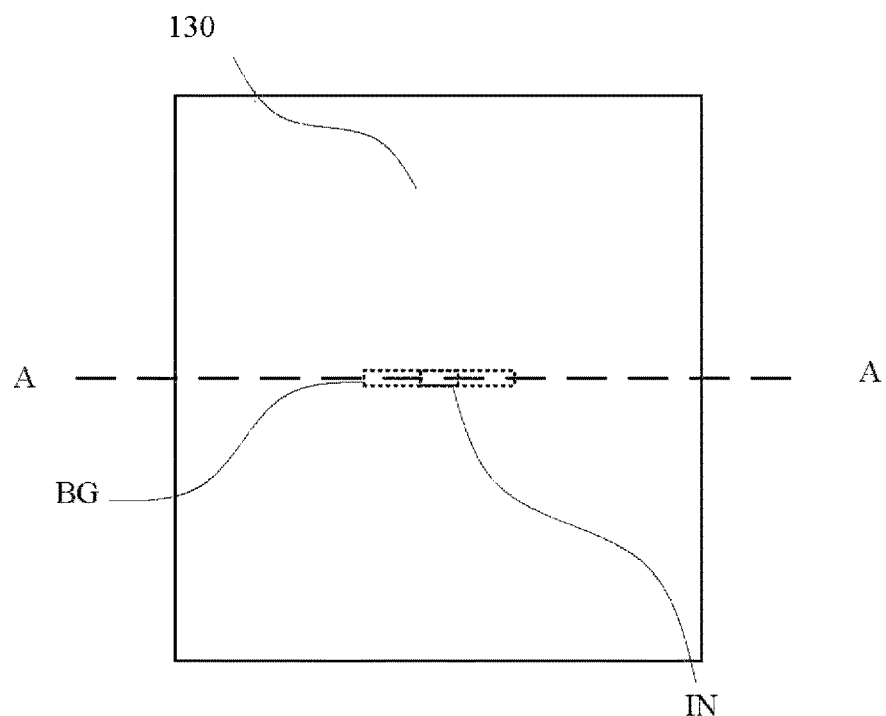
Figure 8B:
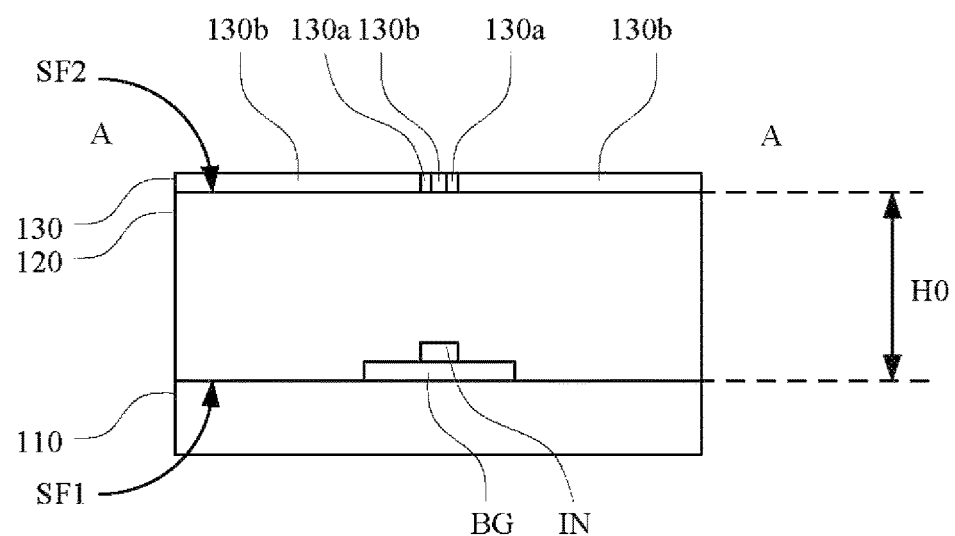

Reference is made now to FIG. 8A and FIG. 8B. In the fourth step, a first conductive material layer 130 is provided on the surface SF2 of the active layer 120. Details of the first conductive material layer 130 can be ascertained by referring to the paragraphs described above, and a description in this regard will not be repeated herein.

Figure 9A:
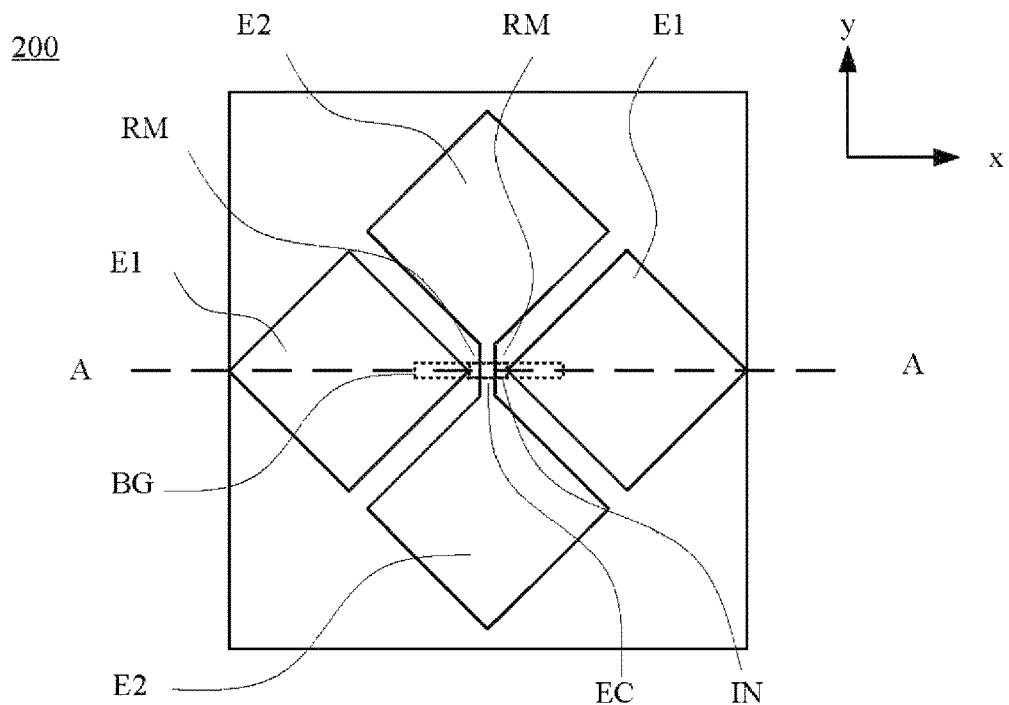
Figure 9B:
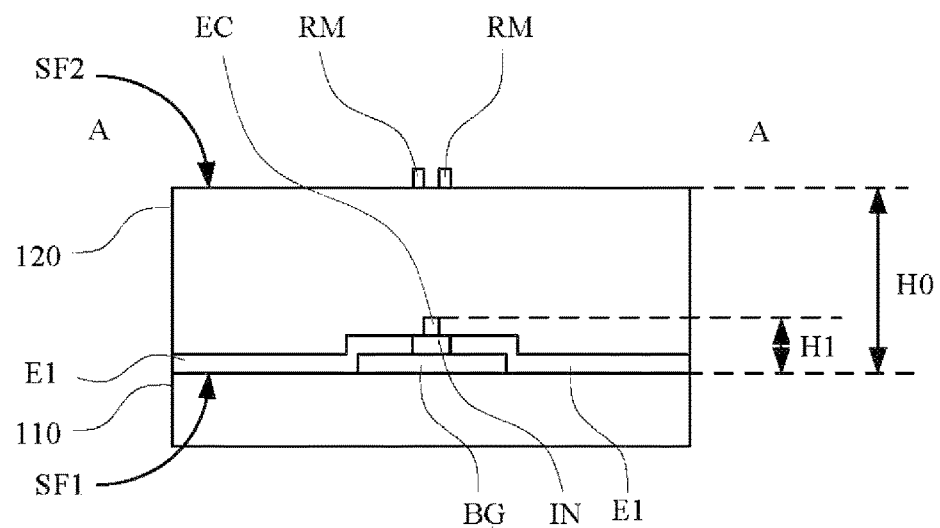

Reference is made next to FIG. 9A and FIG. 9B. In the fifth step, the first embedding portion 130b of the first conductive material layer 130 is embedded into the active layer 120, so as to separately form the first touch electrodes E1, the second touch electrodes E2, and the electrode channel EC. The first touch electrodes E1 are electrically contacted to the bridge BG. The electrode channel EC contacts with the isolating layer IN.

That is, in this step, the first embedding portion 130b of the first conductive material layer 130 can be directly embedded into the active layer until the first touch electrodes E1 and the second touch electrodes E2 of the first embedding portion 130b are in contact with the substrate 110. Since the isolating layer IN is present on the bridge BG, the electrode channel EC in the first embedding portion 130b can be electrically isolated from the bridge BG by the isolated layer IN.

In addition, in this step, the first retention portion 130a of the first conductive material layer 130 can be retained on the surface SF2 of the active layer 120 to form the conductive residual material RM.

In some embodiments, a height of the conductive residual material RM relative to the substrate 110 (e.g., the height H0) is sufficiently different from heights of the first touch electrodes E1, the second touch electrodes E2, and the electrode channel EC relative to the substrate 110 to cause the conductive residual material RM to be isolated from the first touch electrodes E1, the second touch electrodes E2, and the electrode channel EC. In some embodiments, all of the differences between the height of the conductive residual material RM relative to the substrate 110 and the heights of the first touch electrodes E1, the second touch electrodes E2, and the electrode channel EC relative to the substrate 110 are substantially greater than 50 nanometers to cause the conductive residual material RM to be isolated from the first touch electrodes E1, the second touch electrodes E2, and the electrode channel EC. Details of the conductive residual material RM can be ascertained by referring to the paragraphs described above, and a description in this regard will not be repeated herein.

In some embodiments, in the fifth step, the first embedding portion 130b of the first conductive material layer 130 is embedded into the active layer 120 by providing an embedding ink on the first embedding portion 130b of the first conductive material layer 130 (e.g., above the surface SF2 of the active layer 120). Details of such an embedding step can be ascertained by referring to the paragraphs described above, and a description in this regard will not be repeated herein.

Through utilizing the manufacturing method described above, the touch module 200 can be realized. By patterning the first and second touch electrodes E1, E2 and the electrode channel EC with such an embedding process instead of using an etching process, the problem of adversely affecting the optical consistency in the appearance of the touch module 200 caused by uneven refractive indexes of the touch module 200 can be avoided.

Similarly, in some embodiments, substantially no gap or overlap is present among orthogonal projections of the first touch electrodes E1, the second touch electrodes E2, the electrode channel EC, and the conductive residual material RM onto the substrate 110, so that the problem of adversely affecting the optical consistency in the appearance of the touch module 200 in optics can be avoided.

Moreover, in some embodiments, two adjacent second touch electrodes E2 are electrically connected to each other via the electrode channel EC. Two adjacent first touch electrodes E1 are electrically connected to each other via the bridge BG. The shapes and the directions of disposition of the first touch electrodes E1 and the second touch electrodes E2 can be ascertained by referring to the paragraphs described above, and a description in this regard will not be repeated herein.

In addition, in some embodiments, all of the first touch electrodes E1, the second touch electrodes E2, and the electrode channel EC are completely embedded into the active layer 120. That is, all of the first touch electrodes E1, the second touch electrodes E2, and the electrode channel EC are not exposed on the surface SF2 of the active layer 120. As a result, it is not necessary for the touch module 200 to have an additional passive layer to protect or isolate the first touch electrodes E1, the second touch electrodes E2, and the electrode channel EC, as would be necessary were these elements exposed on the surface SF2 of the active layer 120, such that the time and costs associated with manufacturing the touch module 200 can be decreased. In addition, due to the fact that all of the first touch electrodes E1, the second touch electrodes E2, and the electrode channel EC are completely embedded in the active layer 120, the subsequent manufacturing and assembly of the touch module 200 are facilitated.

In some embodiments, in order to avoid exposing any one of the first touch electrodes E1, the second touch electrodes E2, or the electrode channel EC on the surface SF2 of the active layer 120, the embedding depth (e.g., H0-H1) of the first touch electrodes E1, the second touch electrodes E2, and the electrode channel EC (e.g., the second touch electrodes E2) which is closest to the surface SF2 of the active layer 120 is substantially 10 to 500 nanometers relative to the surface SF2 of the active layer 120.

Figure 10:
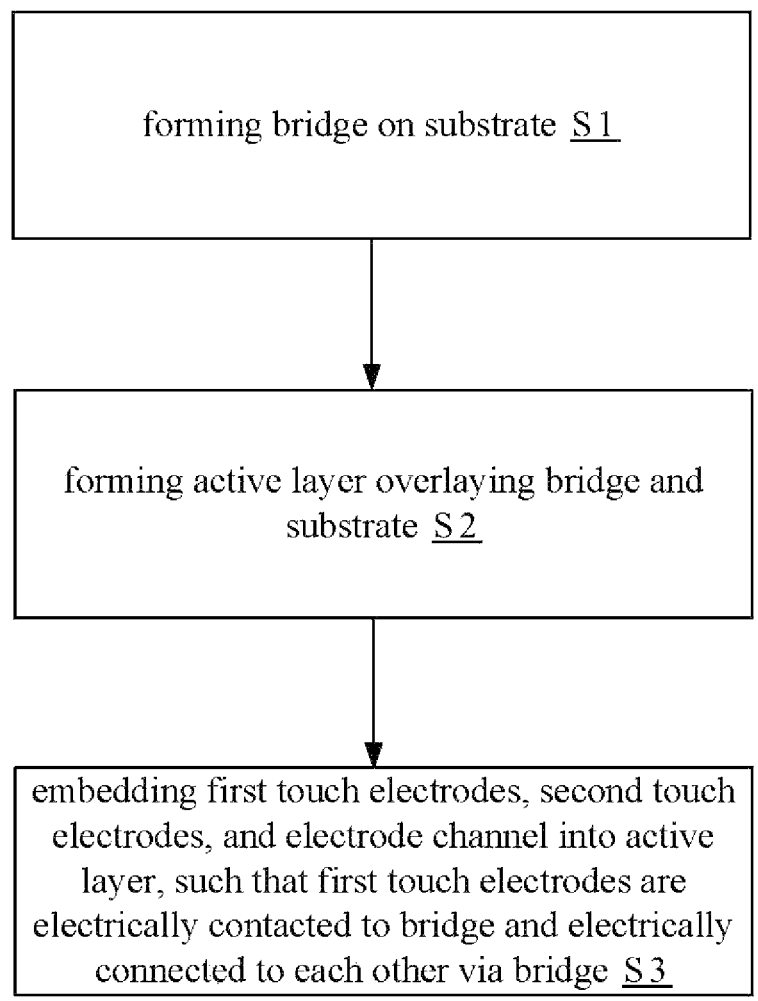
FIG. 10 is a flow chart of a manufacturing method of a touch module according to various embodiments of the present disclosure.

FIG. 10 is a flow chart of a manufacturing method 300 of a touch module according to at least one embodiment of the present disclosure. The manufacturing method 300 can be utilized to manufacture the touch module 100 and touch module 200 as described above, but is not limited in this regard. In the paragraphs below, the touch module 100 is taken as an example to describe the manufacturing method 300, but the present disclosure is not limited in this regard. The manufacturing method 300 includes the steps outlined below.

In step S1, at least one bridge BG is formed on a substrate 110.

In step S2, an active layer 120 is formed. The active layer 120 overlays the bridge BG and the substrate 110.

In step S3, at least two first touch electrodes E1, at least two second touch electrodes E2, and at least one electrode channel EC are embedded into the active layer 120, such that the first touch electrodes E1 are electrically contacted to the bridge BG and electrically connected to each other via the bridge BG. The electrode channel EC is configured to electrically connect the second touch electrodes E2 to each other.

Through utilizing the manufacturing method 300 described above, the touch module 100 can be realized. By patterning the first and second touch electrodes E1, E2 and the electrode channel EC with such an embedding process and instead of using an etching process, the problem of adversely affecting the optical consistency in the appearance of the touch module 100 caused by uneven refractive indexes of the touch module 100 can be avoided.

Embodiments of the present disclosure are related to a touch module. The touch module includes a substrate, at least one bridge, an active layer, at least two first touch electrodes, at least two second touch electrodes, and at least one electrode channel. The bridge is disposed on the substrate. The active layer overlays the bridge and the substrate. The first touch electrodes are embedded in the active layer and electrically contacted to the bridge, such that the first touch electrodes are electrically connected to each other via the bridge. The second touch electrodes are embedded in the active layer. The electrode channel is embedded in the active layer, and configured to electrically connect the second touch electrodes to each other. The first touch electrodes are electrically isolated from the second touch electrodes.

Some embodiments of the present disclosure are related to a manufacturing method of a touch module. The manufacturing method includes forming at least one bridge on the substrate; forming an active layer overlaying the bridge and the substrate, and embedding at least two first touch electrodes, at least two second touch electrodes, and at least one electrode channel into the active layer, such that the first touch electrodes are electrically contacted to the bridge and electrically connected to each other via the bridge. The electrode channel is configured to electrically connect the second touch electrodes to each other.

Although the present disclosure has been described in considerable detail with reference to certain embodiments thereof, other embodiments are possible. Therefore, the scope of the appended claims should not be limited to the description of the embodiments contained herein.

What is claimed is:

1. A touch module comprising:
a substrate;
at least one bridge disposed on the substrate;
an electrically isolating active layer overlaying the bridge and the substrate;
at least two first touch electrodes embedded in the electrically isolating active layer and electrically contacting the bridge, wherein:
the first touch electrodes are electrically connected to each other via the bridge, and
the electrically isolating active layer contacts a top surface and a sidewall of each of the first touch electrodes;
at least two second touch electrodes embedded in the electrically isolating active layer, wherein the electrically isolating active layer contacts a top surface and a sidewall of each of the second touch electrodes;
at least one electrode channel embedded in the electrically isolating active layer, wherein:
the electrode channel is configured to electrically connect the second touch electrodes to each other, and
the first touch electrodes are electrically isolated from the second touch electrodes; and
a conductive residual material formed on a surface of the electrically isolating active layer, wherein an orthogonal projection of the conductive residual material onto the substrate is located among orthogonal projections of the first touch electrodes, the second touch electrodes, and the electrode channel onto the substrate.

2. The touch module as claimed in claim 1, wherein heights of the first touch electrodes relative to the substrate are different from heights of the second touch electrodes relative to the substrate.

3. The touch module as claimed in claim 2, wherein a difference between the heights of the first touch electrodes relative to the substrate and the heights of the second touch electrodes relative to the substrate is greater than substantially 50 nanometers.

4. The touch module as claimed in claim 1, wherein heights of the first touch electrodes relative to the substrate are the same as heights of the second touch electrodes relative to the substrate.

5. The touch module as claimed in claim 1, further comprising:
an isolating layer disposed on the bridge, wherein the isolating layer is configured to isolate the bridge from the electrode channel.

6. The touch module as claimed in claim 1, wherein the orthogonal projections of the conductive residual material, the first touch electrodes, the second touch electrodes, and the electrode channel onto the substrate are substantially not overlapped with each other.

7. The touch module as claimed in claim 1, wherein a height of the conductive residual material relative to the substrate is different from heights of the first touch electrodes, the second touch electrodes, and the electrode channel relative to the substrate to cause the conductive residual material to be isolated from the first touch electrodes, the second touch electrodes, and the electrode channel.

8. The touch module as claimed in claim 7, wherein:
a difference between the height of the conductive residual material relative to the substrate and the heights of the first touch electrodes relative to the substrate is greater than substantially 50 nanometers, and
a difference between the height of the conductive residual material relative to the substrate and the heights of the second touch electrodes relative to the substrate is greater than substantially 50 nanometers.

9. The touch module as claimed in claim 1, wherein embedding depths of the first touch electrodes or the second touch electrodes relative to the surface of the electrically isolating active layer on which the conductive residual material is disposed are substantially 10 to 500 nanometers.

10. The touch module as claimed in claim 1, wherein a height of the electrode channel relative to the substrate is the same as heights of the second touch electrodes relative to the substrate.

11. The touch module as claimed in claim 1, wherein:
the first touch electrodes are disposed along a first direction,
the second touch electrodes are disposed along a second direction, and
the first direction is different from the second direction.

12. The touch module as claimed in claim 1, wherein each of the first touch electrodes and the second touch electrodes has a diamond shape.

13. The touch module as claimed in claim 1, wherein at least one of the first touch electrodes or the second touch electrodes comprise at least one of carbon nanotubes, nano metal wires, a conductive adhesive, a conductive polymer, or graphene.

14. The touch module as claimed in claim 1, wherein the electrically isolating active layer comprises at least one of polymethyl methacrylate (PMMA), polycarbonate (PC), polyethylene terephthalate (PET), or cyclo olefin polymer (COP).

15. A manufacturing method of a touch module, the manufacturing method comprising:
   forming at least one bridge on a substrate;
   providing at least one isolating layer on the bridge;
   forming an active layer overlaying the bridge, the isolating layer, and the substrate;
   forming a first conductive material layer on a top surface of the active layer; and
   embedding a portion of the first conductive material layer into the active layer to space the portion of the first conductive material layer apart from the top surface of the active layer upon which the portion of the first conductive material layer was formed, wherein:
      the portion of the first conductive material layer defines at least two first touch electrodes, at least two second touch electrodes, and at least one electrode channel,
      embedding the portion of the first conductive material layer into the active layer comprises:
         embedding a first embedding portion of the first conductive material layer into the active layer until the first touch electrodes and the second touch electrodes in the first embedding portion contact the substrate and the electrode channel in the first embedding portion contacts the isolating layer to separately form the first touch electrodes, the second touch electrodes, and the electrode channel, and make the first touch electrodes electrically contact the bridge; and
         retaining a first retention portion of the first conductive material layer on the top surface of the active layer, wherein the electrode channel is electrically isolated from the bridge by the isolating layer,
      the first touch electrodes are electrically contacted to the bridge and electrically connected to each other via the bridge, and
      the electrode channel is configured to allow the second touch electrodes to be electrically connected to each other.

16. The manufacturing method as claimed in claim 15, wherein embedding the first embedding portion of the first conductive material layer into the active layer comprises:
   providing an embedding ink on the first embedding portion of the first conductive material layer, so as to cause the first embedding portion of the first conductive material layer to be embedded into the active layer.

17. The manufacturing method as claimed in claim 15, wherein:
   the first retention portion comprises a conductive residual material, and
   an orthogonal projection of the conductive residual material onto the substrate is located among orthogonal projections of the first touch electrodes, the second touch electrodes, and the electrode channel onto the substrate.

18. The manufacturing method as claimed in claim 15, wherein embedding the portion of the first conductive material layer into the active layer comprises:
   triggering the active layer to swell.

19. A manufacturing method of a touch module, the manufacturing method comprising:
   forming at least one bridge on a substrate;
   forming an active layer overlaying the bridge and the substrate;
   forming a first conductive material layer on a top surface of the active layer; and
   embedding a portion of the first conductive material layer into the active layer to space the portion of the first conductive material layer apart from the top surface of the active layer upon which the portion of the first conductive material layer was formed, wherein:
      the portion of the first conductive material layer defines at least two first touch electrodes, at least two second touch electrodes, and at least one electrode channel,
      wherein embedding the portion of the first conductive material layer into the active layer comprises:
         embedding a first embedding portion of the first conductive material layer into the active layer to a height relative to the substrate, so as to form a second conductive material layer, and retaining a first retention portion of the first conductive material layer on the active layer, wherein the second conductive material layer is not electrically contacted to the bridge; and
         embedding a second embedding portion of the second conductive material layer into the active layer to form the first touch electrodes and make the first touch electrodes electrically contact the bridge, and retaining a second retention portion of the second conductive material layer in the active layer at the height relative to the substrate, wherein the second retention portion comprises the second touch electrodes and the electrode channel
      the first touch electrodes are electrically contacted to the bridge and electrically connected to each other via the bridge, and
      the electrode channel is configured to allow the second touch electrodes to be electrically connected to each other.

20. The manufacturing method as claimed in claim 19, wherein embedding the second embedding portion of the second conductive material layer into the active layer comprises:
   providing an embedding ink on the active layer at a position corresponding to the second embedding portion of the second conductive material layer, so as to cause the second embedding portion of the second conductive material layer to be further embedded into the active layer.

21. The manufacturing method as claimed in claim 19, wherein embedding the second embedding portion of the second conductive material layer into the active layer comprises:
   embedding the second embedding portion of the second conductive material layer into the active layer until the first touch electrodes of the second embedding portion is contacted to the substrate.

22. The manufacturing method as claimed in claim 19, wherein:
   the first retention portion comprises a conductive residual material, and an orthogonal projection of the conductive residual material onto the substrate is located among orthogonal projections of the first touch electrodes, the second touch electrodes, and the electrode channel onto the substrate.

23. The manufacturing method as claimed in claim 19, wherein embedding the portion of the first conductive material layer into the active layer comprises:
triggering the active layer to swell.

* * * * *